United States Patent [19]

Casey et al.

[11] Patent Number: 4,831,657
[45] Date of Patent: May 16, 1989

[54] METHOD AND APPARATUS FOR ESTABLISHING PIXEL COLOR PROBABILITIES FOR USE IN OCR LOGIC

[75] Inventors: Richard G. Casey, Morgan Hill; Kottappuram M. Mohiuddin, San Jose, both of Calif.

[73] Assignee: International Business Machines Corporation, Armonk, N.Y.

[21] Appl. No.: 221,164

[22] Filed: Jul. 19, 1988

[51] Int. Cl.⁴ .................................................. G06K 9/00
[52] U.S. Cl. .......................................... 382/39; 382/37
[58] Field of Search ........................ 382/37, 39, 36, 69, 382/50

[56] References Cited

U.S. PATENT DOCUMENTS

| | | | |
|---|---|---|---|
| 3,839,702 | 10/1974 | Chaires et al. | 382/39 |
| 3,964,591 | 6/1976 | Hill et al. | 382/69 |
| 4,274,079 | 6/1981 | Todd et al. | 382/69 |
| 4,499,596 | 2/1985 | Casey et al. | 382/37 |
| 4,589,142 | 5/1986 | Bednar | 382/37 |
| 4,682,365 | 7/1987 | Orita et al. | 382/37 |

OTHER PUBLICATIONS

Moihuddin et al., "Lossless Binary Image Compression Based on Pattern Matching," International Conference on Computers, Systems & Signal Processing, Bangalore, India (Dec. 9-12, 1984).
Casey and Nagy, "Decision Tree Design Using A Probabilisitic Model," IEEE Transactions on Information Theory, vol. IT-30, No. 1, pp. 93-99, (Jan., 1984).
Casey, "Automatic Generation From OCR Logic From Scanned Characters," IBM Technical Disclosure Bulletin, vol. 22, No. 3, pp. 1189-1190 (Aug., 1979).
Lotspiech, "Probabilistic Character Recognition Decision Trees With Style Variations", IBM Technical Disclosure Bulletin, vol. 22, No. 10, pp. 4420-4422 (Mar., 1980).

Primary Examiner—Leo H. Boudreau
Assistant Examiner—Yonnie Jung
Attorney, Agent, or Firm—Peter R. Leal

[57] ABSTRACT

A method of creating a decision tree to enable a character recognition device to recognize characters in a new unknown font includes scanning a document printed in the unknown font to generate an array of pixels, with each pixel having a neighborhood state based on the colors of the surrounding pixels. A plurality of clusters of pixels, each representing a printed character, are identified. A pixel in one cluster is selected, and its neighborhood state determined. The neighborhood state is used to address a memory that has stored in it a probability table providing the probability, in a second font different from the new font being taught, that a pixel is black as a function of its neighborhood state. The stored probability of black associated with the neighborhood state of the select pixel is read from the memory and assigned as the probability of the selected pixel. The decision tree for the new font is generated using that assigned probability of black.

13 Claims, 5 Drawing Sheets

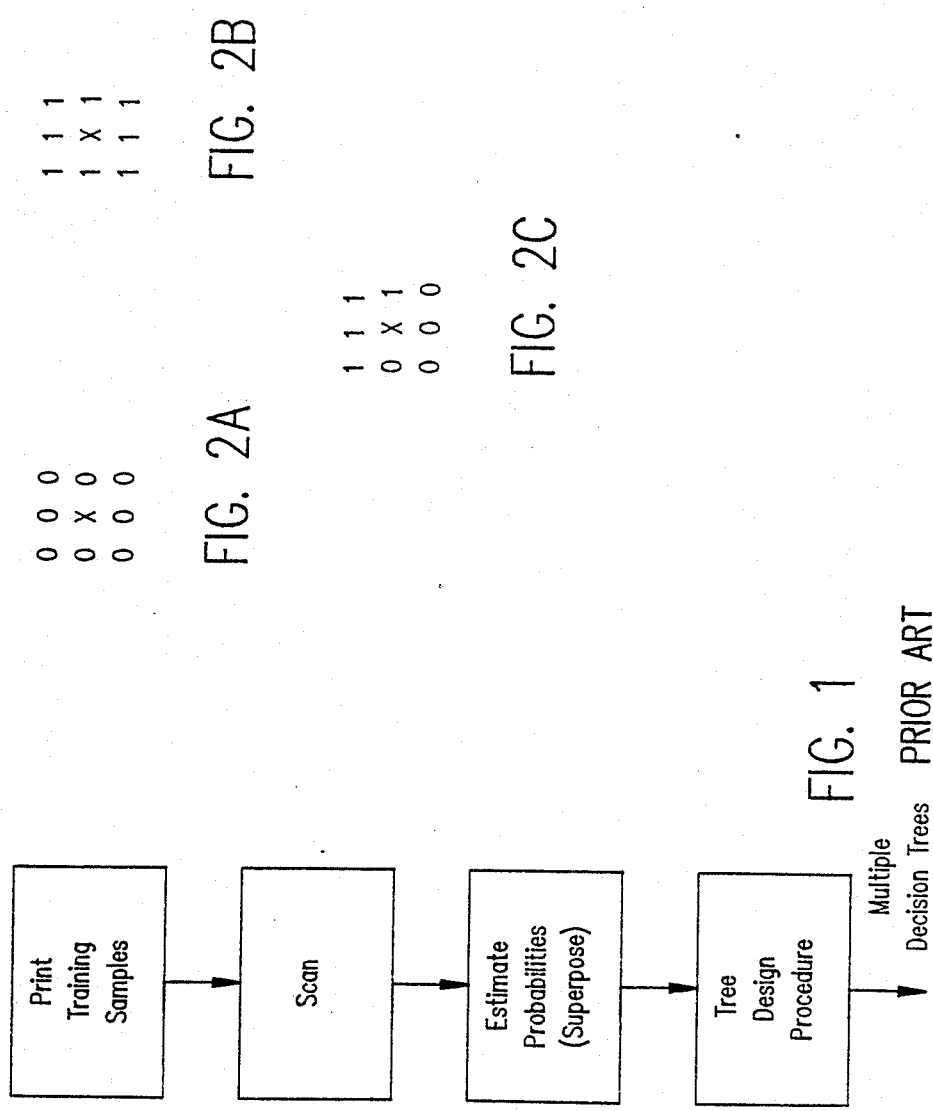

$$2^1 \quad 2^2 \quad 2^3$$
$$2^0 \quad X \quad 2^4$$
$$2^7 \quad 2^6 \quad 2^5$$

METHOD AND APPARATUS FOR ESTABLISHING PIXEL COLOR PROBABILITIES FOR USE IN OCR LOGIC

FIELD OF THE INVENTION

The present invention relates to designing decision trees for optical character recognition (OCR) devices, and specifically to establishing probabilities of color for particular pixels that are useful in generating OCR decision trees.

BACKGROUND OF THE INVENTION

One technique for character recognition is to establish a decision tree in which different pixels are successively examined, and branches are taken at each pixel examination based on whether the pixel is black or white. Such decision trees are known and described in the art.

An optical character recognition device is generally only capable of recognizing characters printed in a font that the OCR device has been trained to recognize. Typically, an OCR device is programmed by its manufacturer to recognize a few common type fonts. But, with the proliferation of laser printers and the widespread ability to generate numerous type fonts, many users desire the ability to train their OCR devices to recognize characters in a new font, different from any included by the manufacturer.

To design a decision tree for an OCR device to recognize characters in a particular font, the probability, for a given character, that a given pixel in a block of pixels representing that character is black is needed to identify pixels useful in differentiating that character from others. An approach to decision tree design is described in Casey et al., "Decision Tree Design Using a Probabilistic Model," *IEEE Transactions on Information Theory*, Vol. IT-30, No. 1, pp. 93-99 (1983).

("Character" is used herein to identify the printed or written symbol to be recognized by the OCR device. A character is typically a letter, a numeral, or some other symbol. It is to be recognized that "character" may also refer to a class of symbols, as when two symbols are very similar and the OCR decision logic does not necessarily distinguish between them, e.g. the numeral "1" and lower case "l" in same type fonts. Also, the following description refers to black and white pixels, although other combinations of distinguishable colors may also be used. Further, in the context of black and white pixels, methods and apparatus are described based on black pixels and probabilities of black. Decision tree logic can also be based on white pixels and probabilities of white.)

To obtain the probabilities of black for individual pixels in each character, hundreds of samples of each character in the font to be recognized must be examined. Collecting and identifying the samples is time consuming and expensive. Often, such large number of samples may not be available.

Thus, a need exists for a technique for designing OCR decision trees with very few (ideally only one) training samples of each character.

A conventional decision tree generation process is shown in FIG. 1. A large plurality of training samples in the font to be recognized is printed. The samples are scanned to generate an array of pixels. For each character or class of characters to be identified, all the samples of that character or class of characters are superimposed, and the probability that a particular pixel is black is counted as the number of times that pixel is black in the samples divided by the number of samples. From such probabilities, certain pixels can be selected for use in generating a decision tree to use in recognizing characters in that font. This procedure usually requires an extremely large number of samples for each character or class of characters, typically on the order of 100 to 200 samples, for accurate character recognition.

SUMMARY OF THE INVENTION

The present invention provides an apparatus and method to reliably estimate the probability of the color of a particular pixel of a character without examining large numbers of character samples. The method of the invention uses the unexpected experimental observation that the probabilities that pixels have certain colors can be reliably estimated as a function of their neighborhood states, with the neighborhood state of a particular pixel being a weighted sum of the values of the pixels in the immediate neighborhood of the pixel under consideration.

The method of the present invention for teaching a character recognition device to recognize characters in an unknown font includes scanning a document printed in the unknown font to generate an array of pixels. The immediate vicinity of each pixel in the array can be analyzed to compute a so-called neighborhood state for the pixel. A block of pixels representing a character is identified. A pixel is selected in the block, and a memory is addressed with the neighborhood state of the selected pixel. The memory has stored in it a probability table providing the probability, in a second font that is different from the first unknown font, that a pixel is black as a function of its neighborhood state. The probability of black associated with the neighborhood state of the selected pixel is read from the memory, and that probability is assigned to the selected pixel. The decision tree is then generated for the unknown font using that assigned probability of black.

BRIEF DESCRIPTION OF THE DRAWINGS

FIG. 1 is a flow diagram of a conventional decision tree development process.

FIGS. 2A, 2B, and 2C illustrate different pixel neighborhoods.

DESCRIPTION OF THE PREFERRED EMBODIMENT

Figures 3, 6:
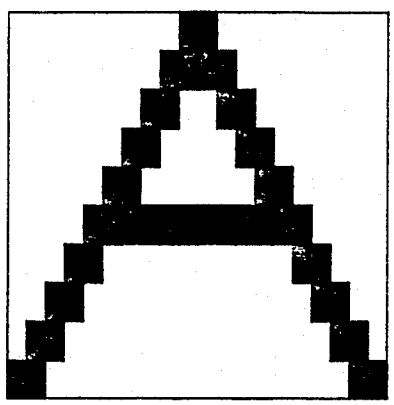
FIG. 3 illustrates one scheme for pixel neighborhood numbering for determining the pixel neighborhood state.
FIG. 6 illustrates a block or cluster of pixels representing a character.

The color of a pixel in a block of pixels depends on the character class to which the pixel belongs. Applicants have found that, unexpectedly, the color of the pixel can be predicted solely as a function of the neighborhood state of the pixel, without any knowledge of the character class to which it belongs.

In a given font, the color of a pixel in a binary pixel pattern may be predicted, given the colors of the neighboring pixels. Refer, for example, to FIG. 2. In FIG. 2A, a pixel X of unknown color is shown surrounded by its eight adjacent neighboring pixels, each of which is shown to have a value 0 (indicating the color white). The central pixel X has a very high probability of being white (having a value 0). The probability is not exactly 1.00, as there may be a stray dot of black at that point. Similarly, referring to FIG. 2B, the central pixel X of the illustrated neighborhood has a very high probability of being black (having a value 1), as its eight surrounding neighbor pixels are black.

An example of a pixel X having a neighborhood that is half black and half white is shown in FIG. 2C. The likelihood that the pixel at the center of this neighborhood has value 1 can be statistically determined by examining a large number of samples. An examination of the ability to predict the color of a pixel given the color of neighboring pixels is provided in Mohiuddin, et al., "Lossless Bihary Image Compression Based on Pattern Matching," International Conference on Computers, Systems & Signal Processing, Bangalore, India (Dec. 9–12, 1984).

The pixel neighborhood comprises a preselected number of surrounding neighbor pixels in the horizontal and vertical directions. Thus, the pixel and its neighborhood form a grid or matrix of pixels. In the illustrated embodiment, the neighborhood comprises the eight adjacent surrounding pixels to form a square $3\times3$ grid. Other arrangements are possible, and the neighborhoods need not be square.

The state of a pixel may be defined as a weighted sum of the elements of its neighborhood. For example, arbitrarily, the neighbor pixels may be numbered clockwise starting from the west neighbor as shown in FIG. 3. The west neighbor is assigned the value $2^0(=1)$. The northwest neighbor is assigned the value $2^1(=2)$, and so forth, with the southwest neighbor assigned the value $2^7(=128)$. The actual numbering itself is not critical, as the objective of the numbering is only to provide a unique identification for each possible neighborhood state. Since there are eight members in the neighborhood, there could be a total of 256 different states.

The neighborhood state is obtained by summing the values of the neighbors that are black. Thus, the pixel neighborhood shown in FIG. 2A, using the numbering system shown in FIG. 3, has a neighborhood state or value of 0, while the neighborhood shown in FIG. 2B has a neighborhood state value of 255. The neighborhood shown in FIG. 2C has a neighborhood state value of 30, the sum of $2^1+2^2+2^3+2^4$.

From a scan of a document of text, the number of times each neighborhood state occurs can be determined, as can the number of times out of those occurrences that the center pixel is black. Thus, the probability that the center pixel is black given that its neighborhood state has a certain value can be determined. This is done by dividing the number of times pixels with a certain neighborhood are black by the number of times that neighborhood state occurs. From this, a table may be generated with an entry of the probability of black for each of the 256 possible neighborhood states.

Figure 4:
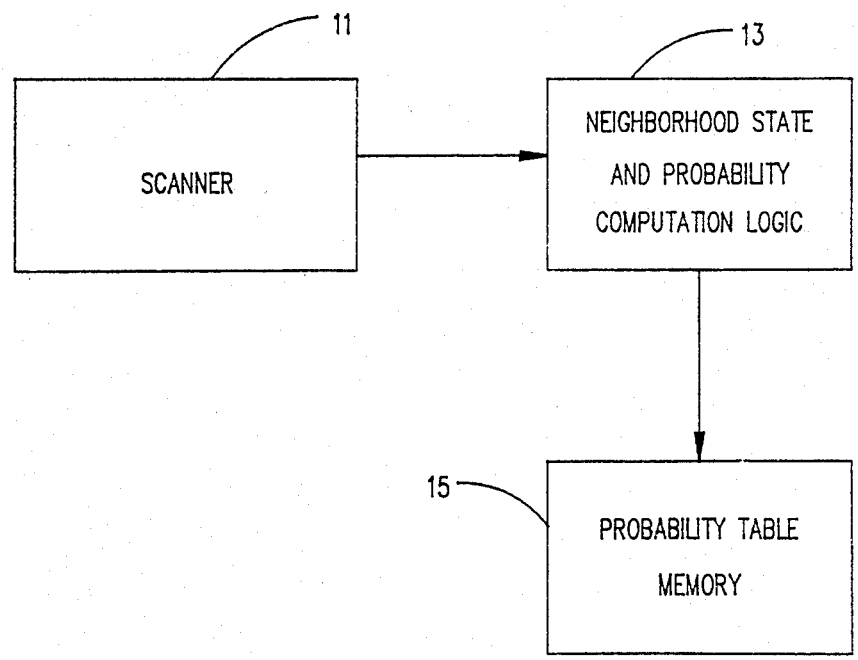
FIG. 4 is a block diagram of apparatus suitable for generating pixel color probability tables.

A block diagram of equipment suitable for generating and storing such a probability table is shown in FIG. 4. The scanner 11 scans a reference document from which the statistics are to be taken and supplies the binary pixel array to the neighborhood state and probability computation logic 13. For each pixel in the array, the logic 13 adds together the assigned values for all the neighbor pixels that are black to obtain the neighborhood state value for that pixel. The color of that pixel under consideration is also determined. Once those statistics are gathered, for each neighborhood state value, the percentage of time that the center pixel was black can be readily determined. That percentage provides the probability of black given the neighborhood state value. Thus, the logic 13 has some memory for temporary storage of various counts as the pixel arrays are examined. The computed probability of black as a function of the neighborhoods state (probability table) is read into a memory 15 for later use.

According to the invention, applicants have discovered that, unexpectedly, the probability table providing the probability of black for a pixel given its neighborhood state, generated as described above, is substantially invariant, regardless of the character class the pixel is located in Thus, the probability table is also independent of the font being examined. Between vastly different fonts or even between fonts representing different languages, the probability table remains substantially constant. Therefore, the probabilities previously generated and stored for one font may be used in teaching the OCR device to recognize the new font.

Thus, to develop a decision tree for a new font, different from the font used in generating the probability table, the probability table generated for one font may be used to significantly reduce the amount of time and the number of symbol or character samples necessary to generate the statistics sufficient for the OCR machine to learn the new font and develop a decision tree for it. Additionally, multiple examples of certain characters in the new font may not be available, meaning that the probabilities of color for pixels cannot be estimated using conventional methods. Consequently, optical character recognition cannot be carried out on the new font using conventional means.

Figure 5:
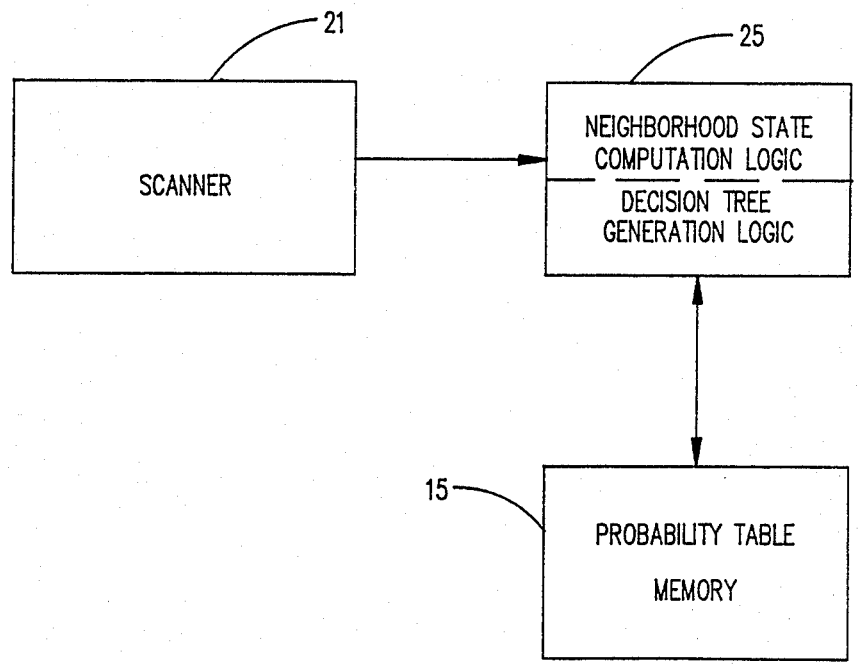
FIG. 5 is a block diagram of apparatus suitable for generating new OCR decision logic according to the invention.

FIG. 5 is a block diagram of a machine suitable for generating new OCR decision logic. The apparatus of FIG. 5 used to generate new OCR decision logic may be the same as that of FIG. 4 used in the development of the probability table. The scanner 21 may be the same as the scanner 11 of the system of FIG. 4. The neighborhood state computation portion of the logic 25 may be the same as the portion of the neighborhood state and probability computation logic 13 shown in FIG. 4. The memory 15, which stores the probability table, may be the same as the memory in which the probability table is originally stored in FIG. 4. To generate the OCR decision tree logic a two way communication between the memory 15 and the logic 25 that performs neighborhood state computation and decision tree generation, while the system of FIG. 4 only requires that the neighborhood state and probability computation logic be able to read data into the memory 15, and need not read data from the memory.

The scanner 21 scans a teaching document printed in the unknown font to be identified or taught to the machine. The scanner 21 converts the document into an array of pixels in a conventional manner. Each pixel is either black or white. Each pixel also has a neighborhood of the type used in developing the probability table stored in the memory. The same neighborhood is used around each pixel as was used in developing the probability table, with corresponding neighbor pixels assigned the same value. In this way, a pixel in the teaching document and a pixel in the reference document used in generating the probability table, both surrounded by pixels of the same colors in the same positions, will have the same neighborhood state value. Using the numbering scheme shown in FIG. 3, the eight pixels surrounding that pixel under examination become the pixel's neighborhood. The neighbor pixels are assigned values as shown in FIG. 3. The west neighbor pixel is assigned the value $2^0=1$, the northwest neighbor $2^1=2$, and so forth, with the southwest neighbor assigned the value $2^7=128$.

Blocks or clusters of pixels, each block representing a character, may be identified in the array of pixels representing the scanned page. An exemplary character pattern of pixels representing the capital letter "A" (and greatly enlarged) is shown in FIG. 6. Such a pattern may be a square having 20 pixels on a side for a total cluster of 400 pixels representing the character.

A pixel to be examined is selected from within the character pattern. The neighborhood state computation logic portion of the logic unit 25 determines the pixel's neighborhood value using the same method for assigning values used in generating the probability table stored in the memory 15. Once the neighborhood state or value is established for the pixel, that neighborhood value is used to address the probability table previously stored in the memory 15. The associated probability stored for that neighborhood state is read out from the memory. The probability read from the stored probability table then is assigned to the selected pixel in the character block for that character of the new font. That assigned probability is then used as the probability of black for that pixel in generating a decision tree for the new font in a known manner.

The decision tree logic design uses the different probabilities of black for various pixels in the different character pixel blocks to determine which pixels should be examined when presented with a new document in the new font. The objective is to find pixels that are useful in distinguishing different characters to be recognized. An appropriate method of designing a decision tree using such probability statistics is described in Casey and Nagy, "Decision Tree Design Using a Probabilistic Model," IEEE Transactions on Information Theory, Vol. IT-30, No. 1, pp. 93-99 (January, 1984).

If more than one sample of a character appears in the teaching document, and the samples are not identical, an average or ideal representative of the character or pixel block representing that character is used for establishing the color of the neighbor pixels involved in the neighborhood state determination.

The averaging of the character involves comparing the different occurrences of that character, and determining for each pixel in the character block whether the pixel is black more often than white or white more often than black. For each pixel that is more often black (at least 50%), that pixel is said to be black for the purposes of being a neighbor to determine the neighborhood states of the pixels within that pixel block. Similarly, a pixel that is white more than 50% of the time is said to be white for the neighborhood value determinations. In this way a more "typical" representative for each character class is generated.

Figure 7:
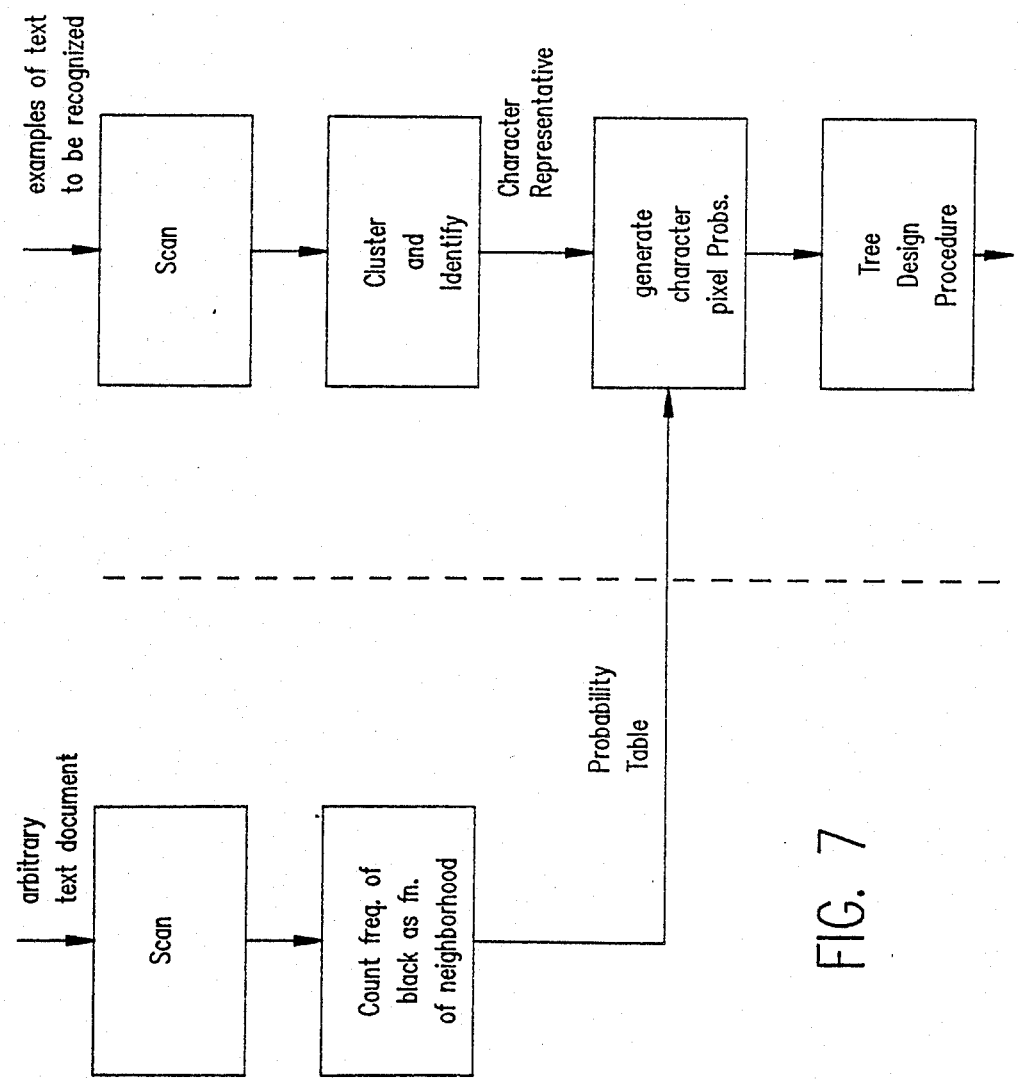
FIG. 7 is a flow diagram of OCR decision tree generation using the invention.

FIG. 7 illustrates a flow diagram of the process of teaching an OCR device to recognize a new font, incorporating the present invention. A description of that flow diagram will summarize the preceding description of the preferred embodiment.

A reference document of text in any font is scanned. The frequency that a pixel is black given that it has a certain neighborhood state is counted to generate a probability table providing the pixel probability of black as a function of neighborhood state. This probability table generation function needs to be done only once, and need not be repeated every time a document in a new font is to be recognized.

When decision tree logic is to be generated for a new font, a document printed in that new font is scanned. The clusters or blocks of pixels or character patterns representing different characters or classes of characters are identified. If more than one representative of a character is identified, those representatives are averaged to obtain a character representative.

Using the character representative, the pixel probabilities for pixels in each character block are generated. From those probabilities the tree design logic can create appropriate OCR decision tree logic.

With the invention, the generation of the probability table (the portion of the diagram in FIG. 7 left of the dashed line) may take place in a different machine than the generation of the character recognition tree (the portion of the diagram in FIG. 7 right of the dashed line). Thus, using the invention, the manufacturer of the optical character recognition device may store the probability table in the device memory, and may in many cases store a few character recognition decision trees in the device. The manufacturer also stores in the OCR device the programming necessary to enable the device to generate a character recognition decision tree from the pixel probability statistics. Then, if the user wishes to have the OCR device recognize a new font, different from any of the ones for which the manufacturer has stored decision logic trees, the user may have the OCR device generate a new decision tree for the new font.

With the present invention, it will be seen that only a single representative is required for each character in a new font. From that single representative, the OCR device can generate the pixel color probabilities necessary for the tree design logic to create a decision tree for the new font. This greatly simplifies and speeds the generation of new decision trees for recognizing new fonts.

Those skilled in the art will recognize that various changes may be made in the details of the foregoing description without departing from the spirit of the invention. The embodiment described is therefore to be considered merely illustrative and the invention is not to be considered limited to that embodiment.

We claim:

1. A method of creating a decision tree to enable a character recognition device to recognize characters in a first font, comprising:

scanning a document printed in said first font to generate an array of pixels, each having a neighborhood state;

identifying a cluster of pixels in said array representing a character;

selecting a pixel in said cluster;

addressing a memory with the neighborhood state of said selected pixel, wherein said memory has stored in it a probability table providing the probability, in a second font different from said first font, that a pixel is black is a function of its neighborhood state, in which the neighborhood state of each pixel in the second font was determined in exactly the same way as the neighborhood states of the pixels in the first font;

reading from said memory the probability of black associated with the neighborhood state of said selected pixel and assigning said probability to said selected pixel; and generating a decision tree for said first font using said assigned probability of black.

2. The method of claim 1 wherein the neighborhood state of each pixel is determined by examining a matrix comprising a preselected number of pixels surrounding said pixel under consideration.

3. The method of claim 2 wherein the neighborhood state of each pixel comprises a weighted sum of values assigned to pixels in said matrix based on their positions in said matrix.

4. The method of claim 3 wherein said matrix comprises the eight pixels immediately adjacent the pixel under consideration.

5. The method of claim 1, additionally comprising identifying a plurality of additional clusters of pixels, each cluster representing a character.

6. The method of claim 5, additionally comprising comparing clusters representing the same character, and forming an average cluster for that character for determining the neighborhood states of pixels.

7. The method of claim 6, wherein said step of forming an average cluster comprises assigning to each pixel the color black if the corresponding pixel in at least half the compared blocks is black.

8. A method of creating a decision tree to enable a character recognition device to recognize characters in an unknown font, comprising:

scanning a document printed in a first font to generate an array of binary pixels;

for each pixel in said array, identifying a preselected matrix of neighbor pixels as the pixel's neighborhood;

determining from said pixel array the probability a pixel is black, given the state of its neighboring pixels;

storing a probability table providing, for each pixel neighborhood state, the probability the center pixel is black;

scanning a document printed in an unknown font to generate a second array of binary pixels;

identifying in said array a plurality of clusters of pixels, each cluster representative of a printed character;

for each of a plurality of pixels in each of said clusters, identifying said preselected matrix of neighbor pixels as the pixel's neighborhood, establishing the neighborhood state of that pixel based on said pixel neighborhood, addressing said table by the neighborhood state of that pixel, and reading from said table the probability said pixel is black;

generating a decision tree for said unknown font using the probabilities from said table for selected pixels.

9. The method of claim 8 wherein the neighborhood state of each pixel comprises a weighted sum of values assigned to the pixels in said matrix based on their positions in said matrix.

10. The method of claim 8, additionally comprising:

comparing a plurality of clusters representing the same printed character; and forming an average cluster for that character by assigning to each pixel in said average cluster the color black if the corresponding pixel in at least half the compared blocks is black.

11. In a method for teaching an OCR deice to recognize characters in an unknown font, a method of assigning a probability that a pixel has a first color to said pixel, comprising:

(a) scanning a reference document printed in a first font and converting said scanned reference document into an array of pixels, wherein:

(i) each converted pixel has either a first color or a second color; and (ii) each converted pixel has a neighborhood comprising a predetermined number of neighbor pixels adjacent said converted pixel; and (iii) said neighborhood has a neighborhood state determined by the colors of the neighbor pixels;

(b) determining, for each pixel of said scanned reference document, the color of that pixel;

(c) determining, for each pixel of said scanned reference document, its neighborhood state;

(d) dividing the number of times a pixel in a neighborhood having a first neighborhood state has said first color by the number of times in said scanned document said first neighborhood static appears in said reference document to obtain a probability that a pixel has said first color given that its neighborhood has said first neighborhood state;

(e) repeating step (d) for each possible neighborhood state to generate a probability table comprising a list of all the possible neighborhood states and the associated probability of the center pixel having said first color;

(f) storing said probability table in said OCR device; and (g) scanning a second document printed in an unknown second font and converting said second document into an array of pixels, wherein:

(i) each converted pixel has either a first color or a second color;

(ii) each converted pixel has a neighborhood comprising a predetermined number of neighbor pixels adjacent said converted pixel, wherein said neighborhood comprises the corresponding neighbor pixels as the neighborhood of the pixels of said reference document; and (iii) said neighborhood has a neighborhood state determined by the colors of said neighbor pixels;

(h) determining, for each pixel, the state of its neighborhood; and (i) for each pixel, looking up the corresponding neighborhood state in said stored probability table and reading out from said probability table the probability said pixel has said first color.

12. The method of claim 11, wherein said step of scanning said second document comprises:

identifying a first character printed on said second document and defined by the pixels in a pixel cluster;

determining if said first character appears more than once in said second document; and if said first character appears more than once in said second document, averaging a plurality of the occurrences of said first character to obtain an average first character.

13. The method of claim 12, wherein said step of averaging said first character comprises:

comparing the different occurrences of said first character;

determining for each pixel in the character window from said first character whether the pixel has said first color more often than said second color;

for each pixel that has said first color more than said second color, that pixel is determined to have said first color in said averaged first character; and for each pixel that has said second color more often than said first color, that pixel is determined to have said second color in said averaged first character.

* * * * *

UNITED STATES PATENT AND TRADEMARK OFFICE
CERTIFICATE OF CORRECTION

PATENT NO. : 4,831,657

DATED : May 16, 1989

INVENTOR(S) : Casey et al.

It is certified that error appears in the above-identified patent and that said Letters Patent is hereby corrected as shown below:

BACKGROUND OF THE INVENTION

Column 1, Line 38, "(1983)" should be -- (1984) --.

DESCRIPTION OF THE PREFERRED EMBODIMENTS

Column 4, Line 20, after "pixel is located in", insert -- . --.

Column 6, Line 66, remove "is" and insert -- as --. (2nd occurrence)

Signed and Sealed this

Sixth Day of March, 1990

Attest:

JEFFREY M. SAMUELS

*Attesting Officer*  *Acting Commissioner of Patents and Trademarks*